United States Patent
Narvaez Tijerina

(10) Patent No.: US 10,850,827 B2
(45) Date of Patent: Dec. 1, 2020

(54) AIRFOILS FOR STUNT FLIGHTS

(71) Applicant: Juan Gerardo Narvaez Tijerina, Monterrey (MX)

(72) Inventor: Juan Gerardo Narvaez Tijerina, Monterrey (MX)

(*) Notice: Subject to any disclaimer, the term of this patent is extended or adjusted under 35 U.S.C. 154(b) by 0 days.

(21) Appl. No.: 16/571,333

(22) Filed: Sep. 16, 2019

(65) Prior Publication Data

US 2020/0070950 A1    Mar. 5, 2020

Related U.S. Application Data

(63) Continuation-in-part of application No. 15/504,625, filed as application No. PCT/MX2015/000117 on Aug. 18, 2015, now Pat. No. 10,414,482.

(30) Foreign Application Priority Data

Aug. 21, 2014    (MX) .................. MX/u/2014/000421

(51) Int. Cl.
*B64C 3/14*    (2006.01)
*B64F 5/00*    (2017.01)

(52) U.S. Cl.
CPC . *B64C 3/14* (2013.01); *B64F 5/00* (2013.01)

(58) Field of Classification Search
CPC ....................................................... B64C 3/14
See application file for complete search history.

(56) References Cited

U.S. PATENT DOCUMENTS

| | | | | |
|---|---|---|---|---|
| 1,547,644 A * | 7/1925 | Cronstedt | ................. | B64C 3/14 244/35 R |
| 2,257,260 A * | 9/1941 | Kartvelichvili | ........... | B64C 3/14 244/35 R |
| 3,952,971 A * | 4/1976 | Whitcomb | ................ | B64C 3/14 244/35 R |
| 4,240,598 A * | 12/1980 | Vinas Espin | ............. | B64C 3/14 244/35 R |
| 4,412,664 A * | 11/1983 | Noonan | ................ | B64C 27/467 244/35 A |
| 4,413,796 A * | 11/1983 | Bousquet | .................. | B64C 3/14 244/35 R |
| 4,455,003 A * | 6/1984 | Hilbig | ........................ | B64C 3/14 244/35 R |

(Continued)

*Primary Examiner* — Philip J Bonzell
*Assistant Examiner* — Michael B. Kreiner
(74) *Attorney, Agent, or Firm* — Brandon T. Cook; Gunn, Lee & Cave, P.C.

(57) ABSTRACT

The invention relates to airfoils, called jn1431-265 and 1413-362, which operate intelligently by adjusting the variable aerodynamics thereof, not only through the attack and sine angle, but also through the effect of scale (air speed), which, when combined, improve the efficiency of the wings configured therewith by up to 30%, cause the wings to experience a predictable stall and also rapidly recover therefrom, and also making the wings configured therewith more efficient at low speed, which reduces the need to use flaps or slats ("high lift devices"), and, in the event that flaps or slats are used, increase the effect of said airfoils even more. On the other hand, at an increased speed, the aerodynamic variables also adjust by up to a third of the value thereof (the angle of attack remaining unchanged), causing the wing to also be very stable at high speed conditions.

3 Claims, 10 Drawing Sheets

(56) References Cited

U.S. PATENT DOCUMENTS

| | | | | |
|---|---|---|---|---|
| 4,519,746 A | * | 5/1985 | Wainauski | B64C 11/18 416/223 R |
| 4,524,928 A | * | 6/1985 | Schmidt | B64C 3/14 244/35 R |
| 4,773,825 A | * | 9/1988 | Rodde | B64C 11/18 416/223 R |
| 5,957,662 A | * | 9/1999 | Aoki | B64C 3/14 416/223 R |
| 6,651,927 B1 | * | 11/2003 | Hackett | B64C 3/14 244/35 R |
| 7,854,593 B2 | * | 12/2010 | Owen | B64C 27/467 416/223 R |
| 9,199,733 B2 | * | 12/2015 | Keennon | B64C 27/12 |
| 9,208,689 B2 | * | 12/2015 | Fisher | G08G 5/02 |
| 10,137,976 B2 | * | 11/2018 | Klein | B64C 3/14 |
| 2002/0005458 A1 | * | 1/2002 | Carter, Jr. | B64C 3/14 244/35 R |

\* cited by examiner

AIRFOILS FOR STUNT FLIGHTS

CROSS REFERENCE TO RELATED APPLICATIONS

This application is a continuation in part of U.S. patent application Ser. No. 15/504,625.

STATEMENT REGARDING FEDERALLY SPONSORED RESEARCH OR DEVELOPMENT

Not Applicable.

PURPOSE OF INVENTION

The purpose is to improve the airfoils' performance for the construction of wings both in their low-speed performance (takeoff and landing) and their stability at high speeds with an acceptable capacity for inverted flight (acrobatic capacity).

BACKGROUND

It is well established in the field of aviation and aeronautics that airfoils are developed in accordance with specific purposes of flight (of speed, for gliding, acrobatic, etc.). The objective when designing these airfoils is to have airfoils with an improved flight capacity both at low and at high speeds, and with the capacity for inverted flight. There might be in the state of the technique documents such as the U.S. Pat. No. 6,607,164 B2, which presents an airfoil having particular use in a general aviation aircraft operating at generally low speeds. Said airfoil has a shape designed to produce high lift coefficients at low speeds and low drag and lower lift coefficients at higher speeds. Said airfoil's characteristics are not sensitive to surface roughness on the leading edge caused by the accumulation of foreign matter on the airfoil due to the transition to turbulent flow occurring near the leading edge at high lift coefficients, therefore limiting effective use of the airfoils disclosed in the '164 patent to low speeds. In contrast, the airfoils and wings disclosed herein are intended to be used at low speed, high speed and have capacity for inverted (aerobatic) flight.

DETAILED DESCRIPTION OF THE INVENTION

Figure 1:
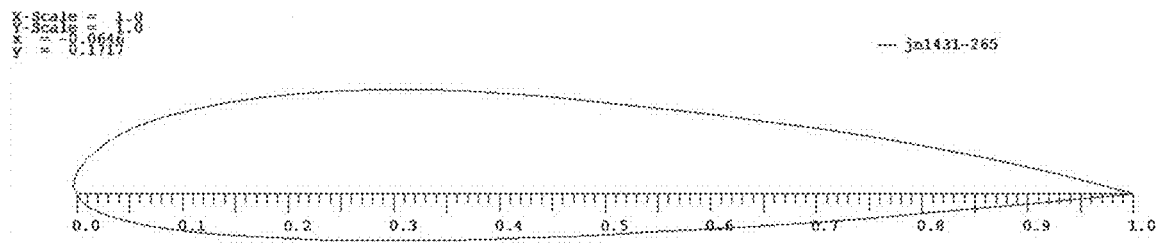
FIG. 1 is a view of airfoil jn1431-265 which will be used for the wing root because it has the lowest lift coefficient and allows for the most stable stall.
Figure 2:
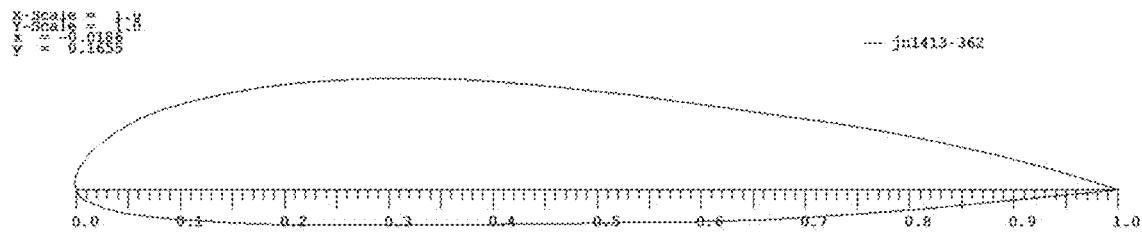
FIG. 2 is a view of airfoil jn1413-362 which will be used for configuring the wing's end and this way make up the combination with the wing root's airfoil jn1431-265 in order to allow for the aforementioned characteristics of the wing's performance.

Airfoils jn1432-265 and jn1413-362, as shown in FIGS. 1 and 2, were designed to be used in the construction of general aviation wings. During the initial phase the design of the upper and lower curves of each airfoil were worked on in order to obtain the highest possible lift coefficient (cl) from is each airfoil section without increasing the camber too much to prevent sacrificing inverted flight, the lift coefficient (cl) differential was also considered between airfoil jn1432-265 and airfoil jn1413-365 in order to have a more predictable stall.

When analyzing the scale effect we found that the different curves when going through angles between 0 and +1 (taking into account that the angle of incidence in which the wing normally flies is within this range) of the graphs, the lift coefficient is highest when the Reynolds number is lowest and decreases as the Reynolds number increases. As the Reynolds number increases the coefficient adjusts to each flight condition, therefore the coefficient is high at slow speeds allowing for short, predictable and safer takeoffs and landings. The coefficient decreases as the speed increases which creates stability by allowing for more flexibility in different flight conditions. It has also been observed that UAVs configured with these wings for testing have a better performance in conditions with increased winds as compared to aircraft that have been configured with other airfoils. Also, the drag coefficient (cd) which in itself is low in the highest values of the lift coefficient (cl) also descends to values up to one third of the initial value as the Reynolds number increases.

The following table contains the coordinates of airfoil jn1431-265 which will be used for the wing root because it has the lowest lift coefficient and allows for the most stable stall.

| jn1431-265 | |
|---|---|
| x/c | y/c |
| 1.00000 | 0.00000 |
| 0.93208 | 0.01735 |
| 0.86931 | 0.03162 |
| 0.81110 | 0.04326 |
| 0.75688 | 0.05274 |
| 0.70609 | 0.06050 |
| 0.65816 | 0.06700 |
| 0.61252 | 0.07269 |
| 0.56862 | 0.07799 |
| 0.52612 | 0.08296 |
| 0.48480 | 0.08744 |
| 0.44444 | 0.09132 |
| 0.40479 | 0.09445 |
| 0.36565 | 0.09669 |
| 0.32678 | 0.09790 |
| 0.28797 | 0.09796 |
| 0.24942 | 0.09678 |

-continued

| jn1431-265 | |
|---|---|
| x/c | y/c |
| 0.21171 | 0.09436 |
| 0.17546 | 0.09069 |
| 0.14128 | 0.08574 |
| 0.10977 | 0.07951 |
| 0.08155 | 0.07198 |
| 0.05722 | 0.06316 |
| 0.03716 | 0.05320 |
| 0.02128 | 0.04262 |
| 0.00946 | 0.03199 |
| 0.00155 | 0.02185 |
| −0.00257 | 0.01277 |
| −0.00305 | 0.00530 |
| 0.00000 | 0.00000 |
| 0.00093 | −0.00350 |
| 0.00392 | −0.00748 |
| 0.00929 | −0.01180 |
| 0.01735 | −0.01630 |
| 0.02843 | −0.02084 |
| 0.04284 | −0.02526 |
| 0.06090 | −0.02941 |
| 0.08287 | −0.03316 |
| 0.10851 | −0.03643 |
| 0.13736 | −0.03922 |
| 0.16892 | −0.04150 |
| 0.20271 | −0.04325 |
| 0.23825 | −0.04445 |
| 0.27506 | −0.04508 |
| 0.31266 | −0.04513 |
| 0.35071 | −0.04463 |
| 0.38901 | −0.04368 |
| 0.42735 | −0.04235 |
| 0.46555 | −0.04074 |
| 0.50340 | −0.03894 |
| 0.54070 | −0.03704 |
| 0.57728 | −0.03513 |
| 0.61394 | −0.03316 |
| 0.65348 | −0.03078 |
| 0.69893 | −0.02764 |
| 0.75328 | −0.02336 |
| 0.81957 | −0.01757 |
| 0.90080 | −0.00990 |
| 1.00000 | 0.00000 |

The following table contains the coordinates of airfoil JN1413-362 which will be used for the wing end.

| x/c | y/c |
|---|---|
| 1.0000 | 0.0000 |
| 0.9430 | 0.0175 |
| 0.8865 | 0.0323 |
| 0.8308 | 0.0447 |
| 0.7762 | 0.0552 |
| 0.7231 | 0.0640 |
| 0.6718 | 0.0716 |
| 0.6226 | 0.0783 |
| 0.5758 | 0.0846 |
| 0.5313 | 0.0904 |
| 0.4886 | 0.0955 |
| 0.4475 | 0.0999 |
| 0.4075 | 0.1033 |
| 0.3682 | 0.1057 |
| 0.3293 | 0.1068 |
| 0.2904 | 0.1067 |
| 0.2517 | 0.1051 |
| 0.2138 | 0.1020 |
| 0.1773 | 0.0977 |
| 0.1430 | 0.0919 |
| 0.1114 | 0.0848 |
| 0.0831 | 0.0763 |
| 0.0590 | 0.0665 |
| 0.0392 | 0.0557 |
| 0.0237 | 0.0442 |

-continued

| x/c | y/c |
|---|---|
| 0.0121 | 0.0325 |
| 0.0042 | 0.0221 |
| −0.0003 | 0.0127 |
| −0.0016 | 0.0051 |
| 0.0000 | 0.0000 |
| 0.0010 | −0.0034 |
| 0.0041 | −0.0071 |
| 0.0097 | −0.0110 |
| 0.0180 | −0.0149 |
| 0.0293 | −0.0187 |
| 0.0439 | −0.0222 |
| 0.0620 | −0.0253 |
| 0.0840 | −0.0280 |
| 0.1096 | −0.0301 |
| 0.1383 | −0.0317 |
| 0.1696 | −0.0329 |
| 0.2032 | −0.0338 |
| 0.2385 | −0.0343 |
| 0.2752 | −0.0345 |
| 0.3126 | −0.0345 |
| 0.3506 | −0.0343 |
| 0.3889 | −0.0340 |
| 0.4272 | −0.0335 |
| 0.4655 | −0.0330 |
| 0.5035 | −0.0324 |
| 0.5410 | −0.0318 |
| 0.5778 | −0.0313 |
| 0.6147 | −0.0306 |
| 0.6545 | −0.0294 |
| 0.7001 | −0.0273 |
| 0.7544 | −0.0237 |
| 0.8206 | −0.0183 |
| 0.9014 | −0.0105 |
| 1.0000 | 0.0000 |

Airfoil jn1431-265 as the wing root combined with airfoil jn1413-362 as the wing end create the aforementioned characteristics of wing performance.

Figure 3:
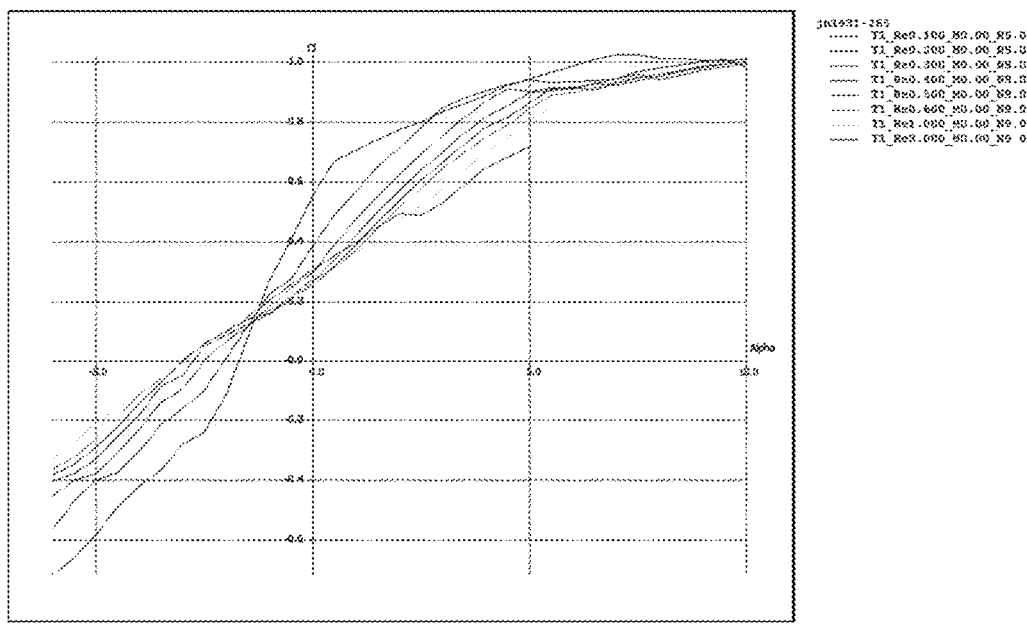
FIG. 3 shows the lift coefficient (cl) at different angles of attack (alpha) and using different scale effects (re) of airfoil jn1431-265.
Figure 4:
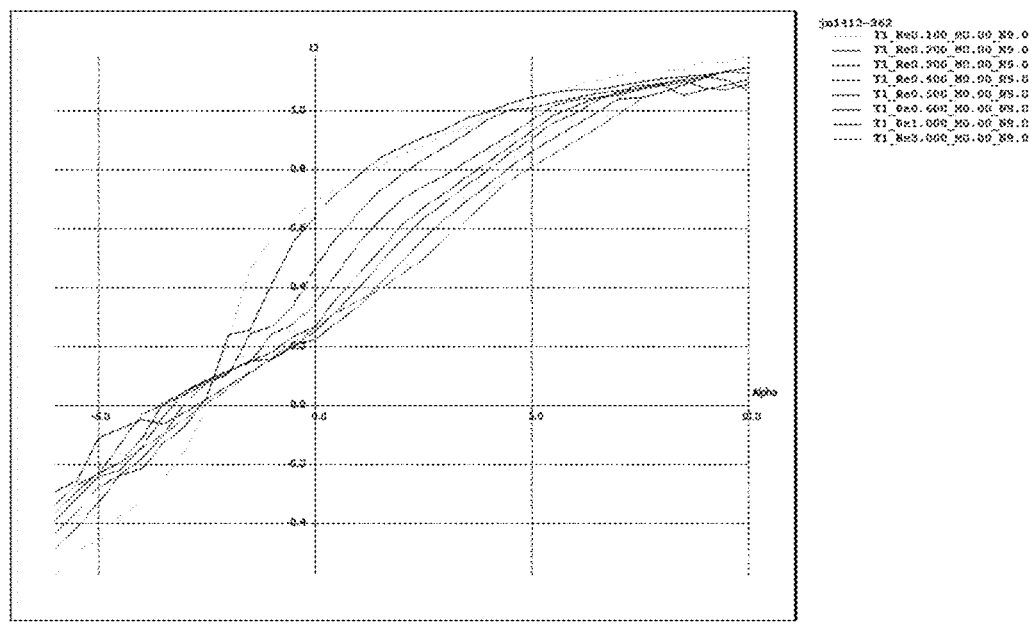
FIG. 4 shows the lift coefficient (cl) at different angles of attack (alpha) and using different scale effects (re) of airfoil jn1413-362.

Airfoil jn1431-265 is 14.31% wide in relation to its length and airfoil jn1413-362 is 14.13% wide in relation to its length. Airfoil jn1431-265 has a camber of 2.65 and airfoil jn1413-362 has a camber of 3.62. Airfoils jn1431-265 and 1413-362 operate intelligently by adjusting their variable aerodynamics, not only by the angle of attack, but also by the scale effect (speed), as shown in FIGS. 3 and 4. When combined, these airfoils improve the efficiency of the wings configured therewith by up to 30%. They also cause the wing to experience a predictable stall as well as a quick recovery therefrom. Additionally, they are more efficient at low speed, reducing the need to use flaps or slats ("high lift devices).

Figure 5:
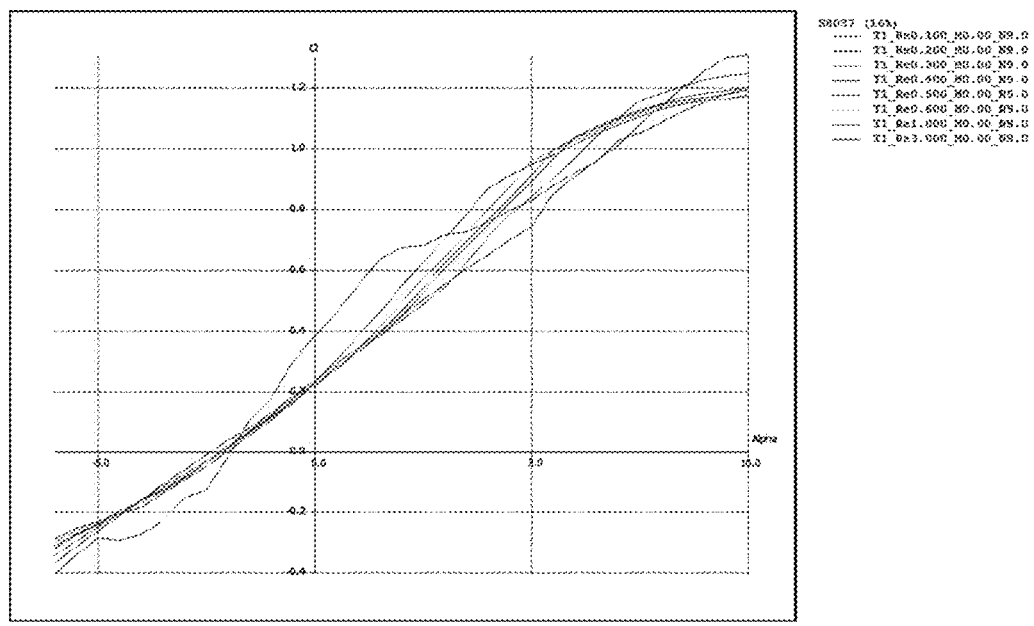
FIG. 5 shows the lift coefficient (cl) at different angles of attack (alpha) and using different scale effects (re) of Dr. Seilig's airfoil s8037 which is included for comparison purposes.

FIG. 5 shows the lift coefficient (cl) at different angles of attack (alpha) and using different scale effects (re) of Dr. Seilig's airfoil s8037 which is included for comparison purposes. On the other hand, as the speed increases the aerodynamic variables adjust by up to a third of the value thereof (with the same angle of attack), causing the wing to also be very stable at this high-speed condition.

Figure 6:
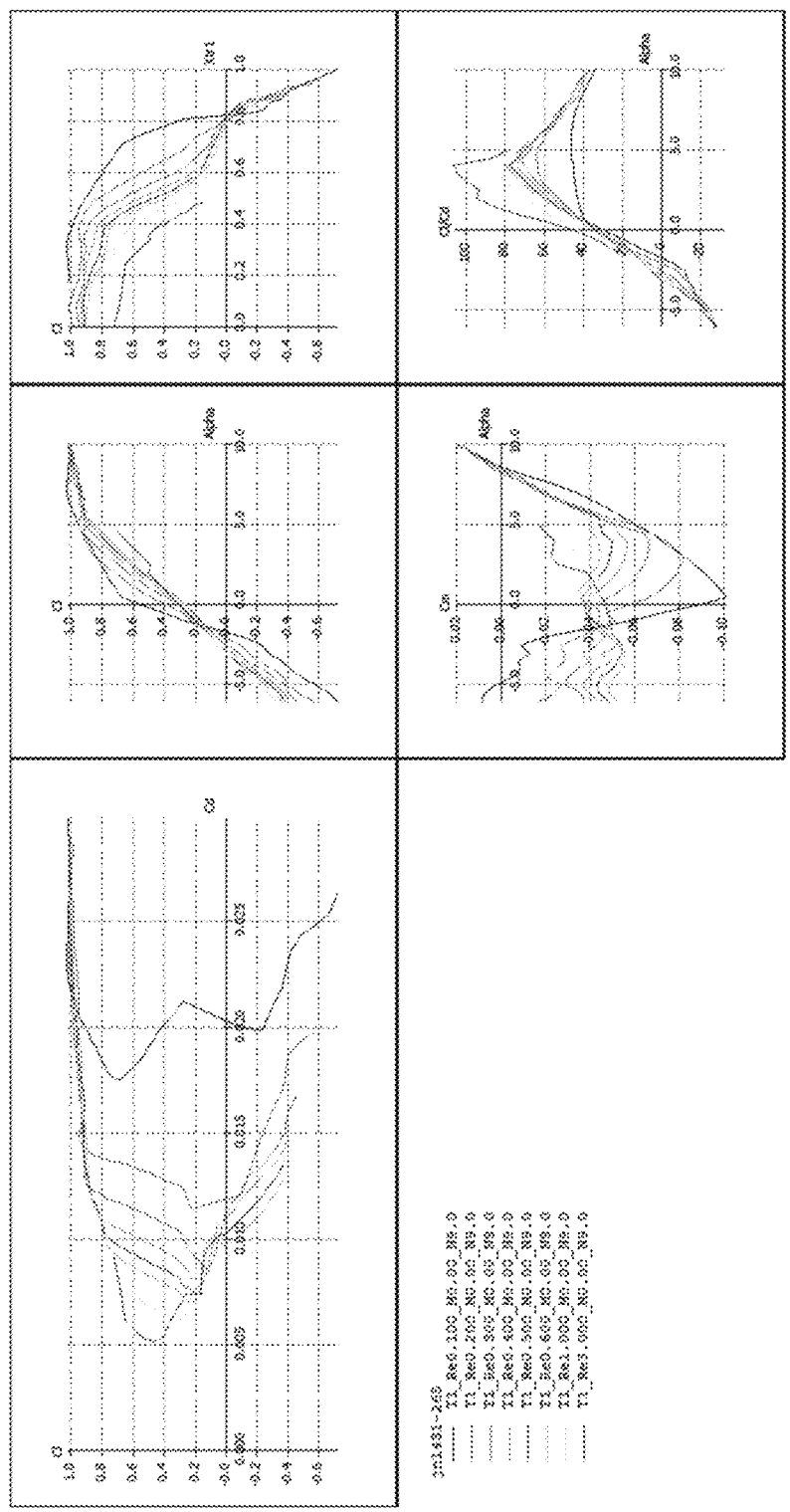
FIG. 6 shows the different polar graphs for airfoil jn1431-265.
Figure 7:
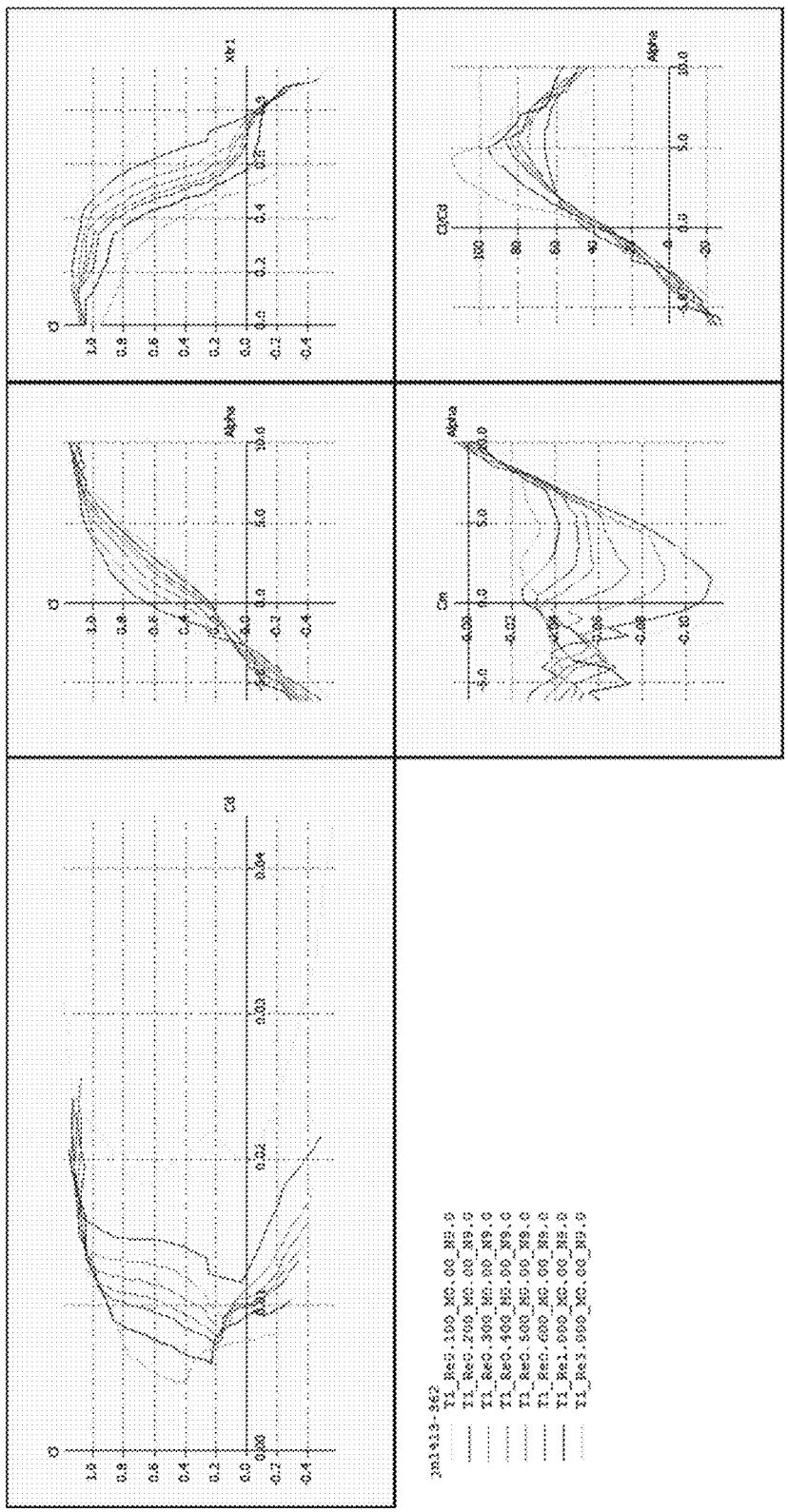
FIG. 7 shows the different polar graphs for airfoil jn1413-362.

FIGS. 6 and 7 show the different polar graphics for airfoils jn1431-265 and jn1413-362, respectively.

Analysis Report for Airfoils jn1431-265 and jn1413-362

Consider the airflow on the airfoil of an airplane wing. With a determined angle of attack the airspeed is supposed to be uniform. The air in free flow (far from the airfoil) will be considered with properties as air at sea level: pressure=101.325 Pa, density=1.2250 kg/m3, temperature=288.16K, kinematic viscosity=1.4607E-05 kg/ms.

Under these conditions, the lift and drag coefficients were determined by using FLUENT for airfoils jn1431-265 and jn1413-362, and for comparative purposes airfoil Selig 1223 (S1223) was added; by function of the angle of attack and the Reynolds number. Additionally the net lift force was obtained and the maximum load which an established surface area can support was determined.

A wing was used measuring 1.524 meters long (L), with a chord (c) measuring 0.3048 meters. The weight of the wing (w) was 3.587 kg, the weight of the fuselage (wf) was 5.702 kg. The minimum load (lm) was 0.861 kg. And the wing's surface area was: A=1.3328 m2.

A simulation domain was set to be sufficiently large so that the far-field boundaries are sufficiently far away from the object causing the flow disturbance, in this case the airplane, and this way the result will be more exact.

The domain defined by the far-field boundaries is shown in FIG. 1, which additionally shows the mesh in detail in proximity to the airfoil. Approximately 160 nodes were used on each airfoil that was examined and were more concentrated toward the front depending on each airfoil. The simulated domain was for x=9.906 meters. And for y=7.62 meters.

Figure 8:
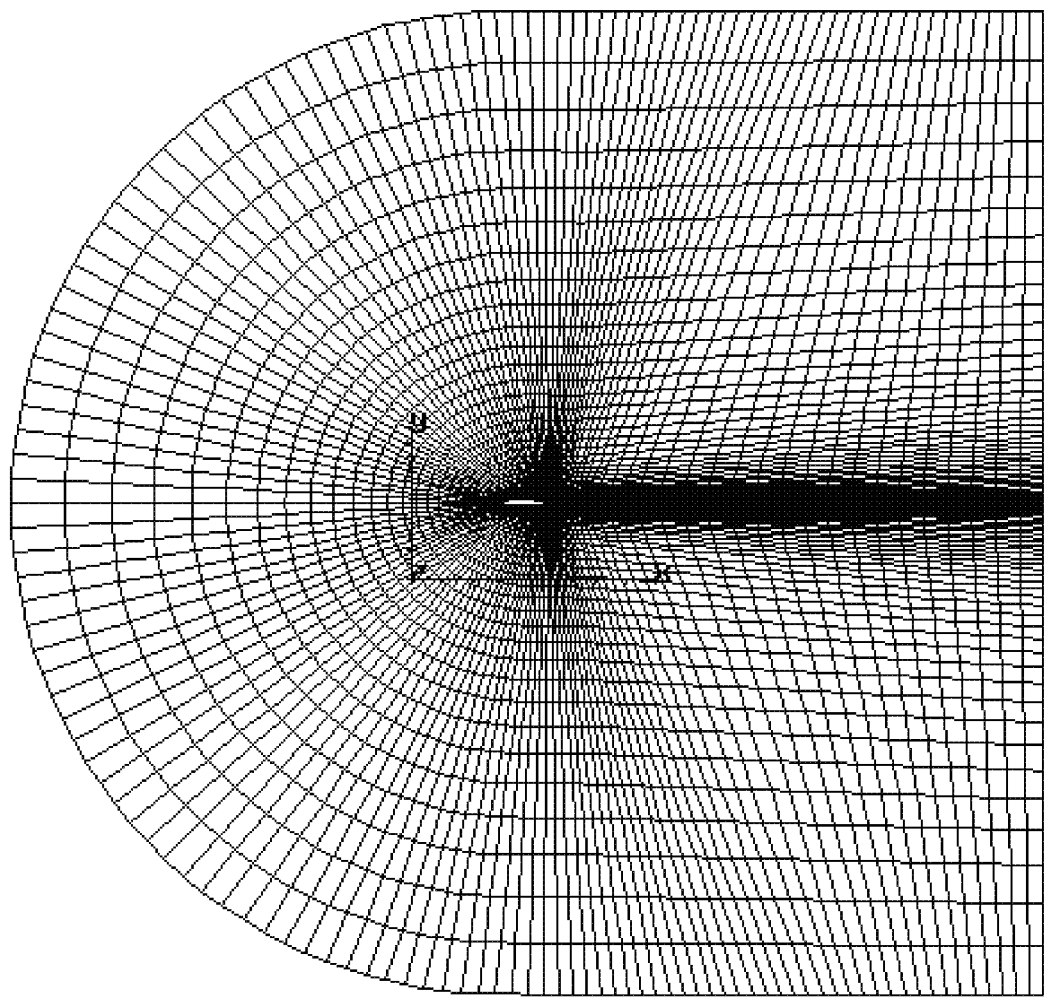
FIG. 8 shows discretization mesh from a simulation domain of airfoils jn1431-265 and jn1413-362.

Referring to FIG. 8, the discretization mesh from the simulation domain is shown.

The following table depicts the boundary conditions for the simulation:

| Farfield1 and Farfield2 | Velocity-inlet |
|---|---|
| condition | Value |
| Modified turbulent viscosity | 0.001 |
| Turbulence intensity | 0.1 |
| Turbulence length scale | 1 |
| Hydraulic diameter | 1 |
| Turbulent viscosity ratio | 10 |

| Farfield3 | Pressure-outlet |
|---|---|
| condition | Value |
| Gauge pressure | 0 |
| Backflow modified turbulent viscosity | 0.001 |
| Backflow turbulence intensity | 0.1 |
| Backflow turbulence length scale | 1 |
| Backflow hydraulic diameter | 1 |
| Backflow turbulent viscosity ratio | 10 |

The following chart depicts the velocity conditions of boundaries farfiled1 and farfield2 for the simulation:

| | re | | | | | |
|---|---|---|---|---|---|---|
| | 225000 | | 355000 | | 266000 | |
| | | | Uo(m/s) | | | |
| | 10.642 | | 16.791 | | 12.581 | |
| AoA(degrees) | x-vel | y-vel | x-vel | y-vel | x-vel | y-vel |
| −7 | 10.563 | −1.297 | 16.666 | −2.046 | 12.488 | −1.533 |
| −5 | 10.602 | −0.928 | 16.727 | −1.463 | 12.534 | −1.097 |
| −3 | 10.628 | −0.557 | 16.768 | −0.879 | 12.564 | −0.658 |
| −1 | 10.641 | −0.186 | 16.789 | −0.293 | 12.580 | −0.220 |
| 0 | 10.642 | 0.000 | 16.791 | 0.000 | 12.581 | 0.000 |
| 1 | 10.641 | 0.186 | 16.789 | 0.293 | 12.580 | 0.220 |
| 3 | 10.628 | 0.557 | 16.768 | 0.879 | 12.564 | 0.658 |
| 6 | 10.584 | 1.112 | 16.699 | 1.755 | 12.513 | 1.315 |
| 9 | 10.511 | 1.665 | 16.584 | 2.627 | 12.427 | 1.968 |
| 12 | 10.410 | 2.213 | 16.424 | 3.491 | 12.307 | 2.616 |

The Reynolds number, Re, was calculated by using the following formula:

$$Re = \frac{\rho U_o c}{\mu}$$

ρ represents density, μ viscosity and Uo represents the magnitude of free flow speed and c is the chord length of the wing's airfoil. X-vel and y-vel are the components of free flow speed in x and y. AoA (a) corresponds to the angle of attack.

The following chart depicts the draft and lift from the domain simulation for each angle of attack:

| AoA (deg) | x-drag | y-drag | x-lift | y-lift |
|---|---|---|---|---|
| −7 | 0.9925 | −0.1219 | −0.1219 | 0.9925 |
| −5 | 0.9962 | −0.0872 | −0.0872 | 0.9962 |
| −3 | 0.9986 | −0.0523 | −0.0523 | 0.9986 |
| −1 | 0.9998 | −0.0175 | −0.0175 | 0.9998 |
| 0 | 1.0000 | 0.0000 | 0.0000 | 1.0000 |
| 1 | 0.9998 | 0.0175 | 0.0175 | 0.9998 |
| 3 | 0.9986 | 0.0523 | 0.0523 | 0.9986 |
| 6 | 0.9945 | 0.1045 | 0.1045 | 0.9945 |
| 9 | 0.9877 | 0.1564 | 0.1564 | 0.9877 |
| 12 | 0.9781 | 0.2079 | 0.2079 | 0.9781 |

It was considered that the flow was isothermal given its low speed. On the other hand the turbulence was considered in order to obtain more exact lift and drag coefficients. For this the Spalart-Allmaras model was chosen, which was specifically designed for aerospace applications and is suitable for flows with boundary layers subjected to adverse pressure gradients. The PRESTO algorithm was used for the pressure equation and the Simple algorithm for coupling the speed and pressure equations. All the calculations were made on Double Precision. The convergence was monitored through residuals normalized for each equation. A 1E-4 convergence criterion was utilized for pressure and 1E-6 for the other variables. A second-order upwind discretization scheme was used for the momentum and turbulence equations.

The following chart depicts the characteristic values for calculating lift and draft coefficients:

| Parameter | Value | Units |
|---|---|---|
| Area | 0.3048 | $m^2$ |
| Density | 1.225 | $kg/m^3$ |
| Length | 0.3048 | m |
| Viscosity | 1.7894E−5 | kg/m s |
| Speed (free flow) | Uo | m/s |

Figure 9:
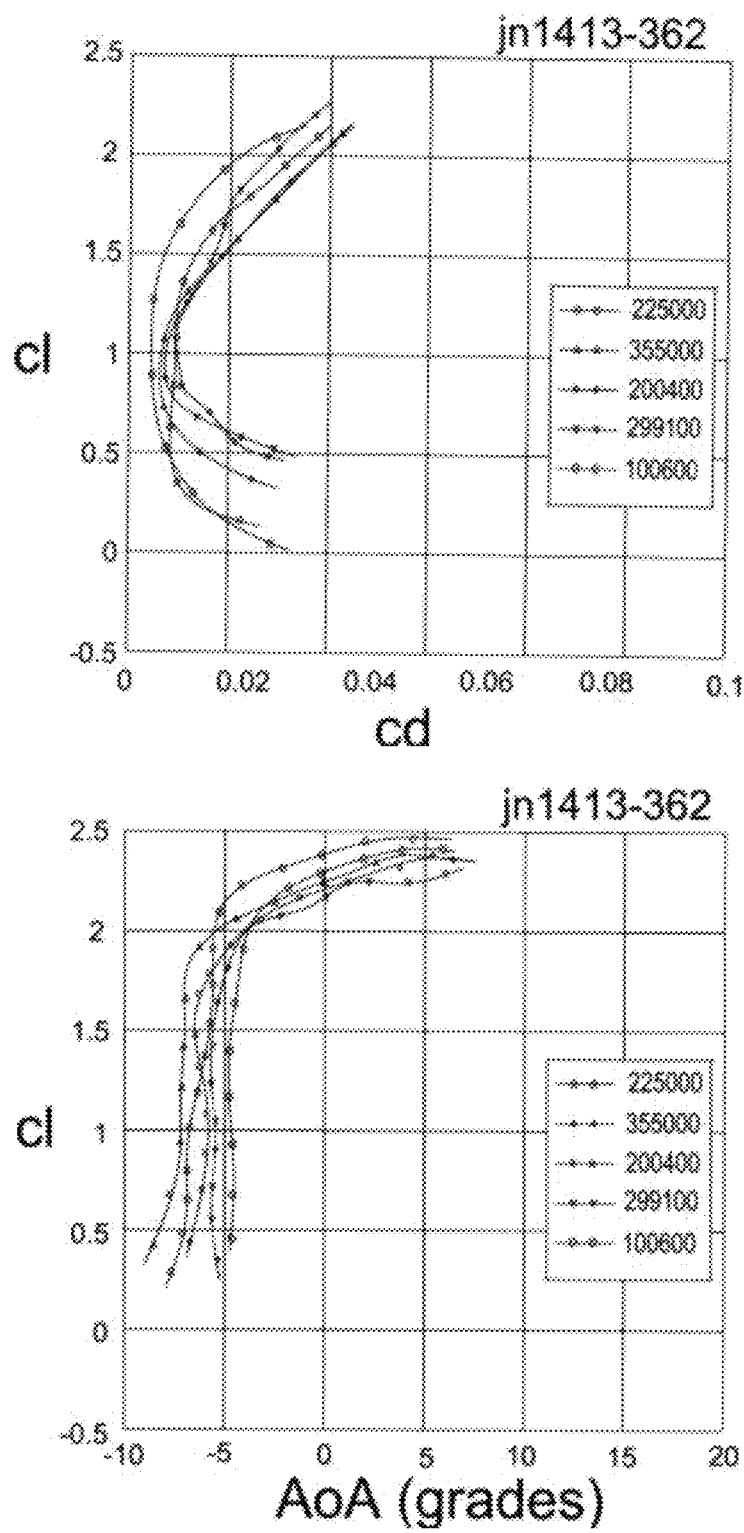
FIG. 9 shows the cl versus cd and cl versus AoA (grades) for jn1413-362.
Figure 10:
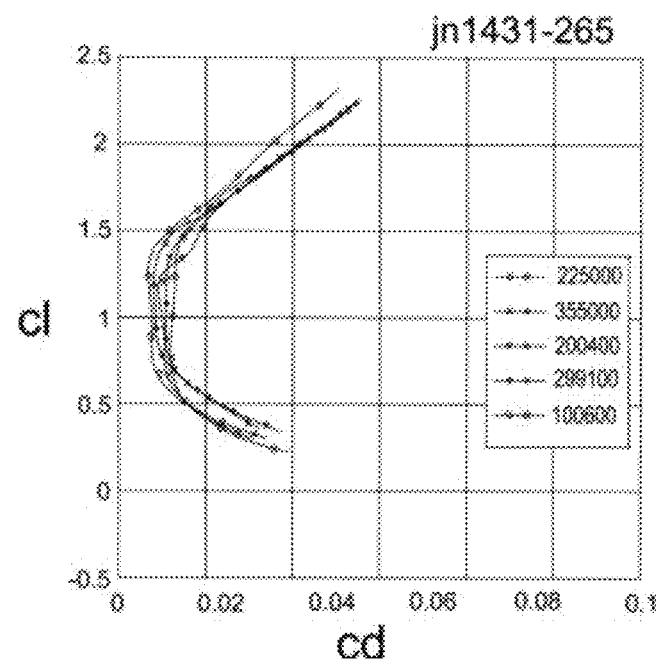
FIG. 10 shows the cl versus cd and cl versus AoA (grades) for jn1431-265.
Figure 10:
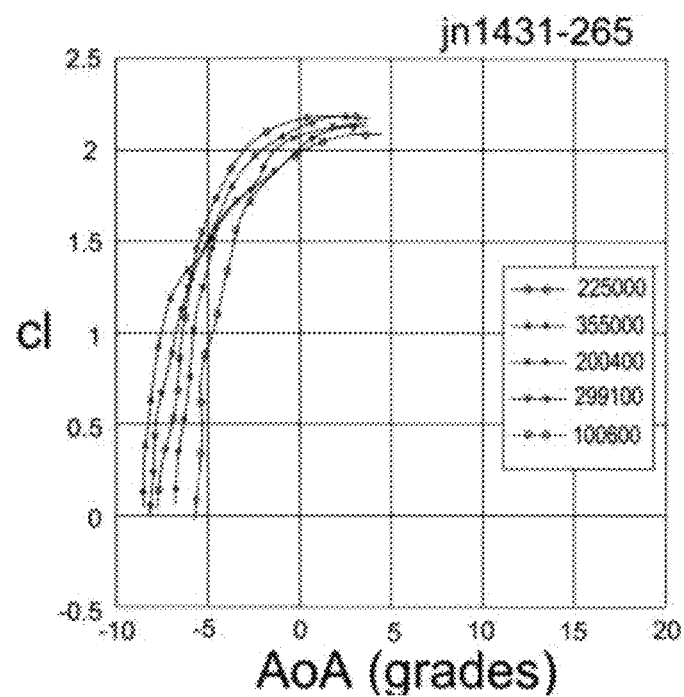
Figure 11:
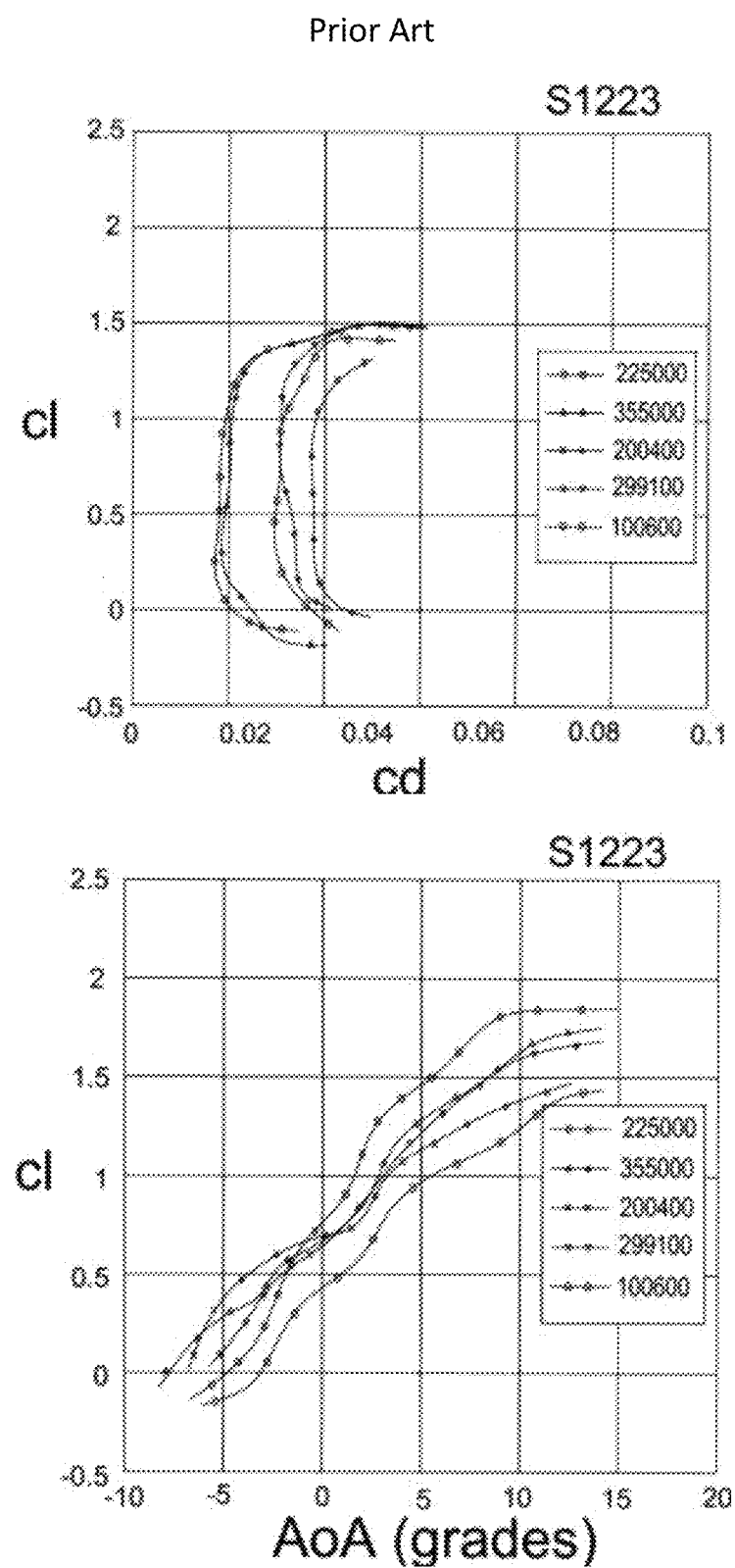
FIG. 11 shows the cl versus cd and cl versus AoA (grades) for prior art airfoil S1223.

Referring to FIG. 9-11, graphs show the lift coefficient graphs (cl) versus the angle of attack (α) and polars for each airfoil at different Reynolds numbers. FIG. 9 depicts data for jn1413-362, FIG. 10 depicts data for jn1431-265, and FIG. 11 depicts data, for comparison, of prior art air foil S1223.

Referring to FIG. 9-11, where on the cl versus cd graph the lift value (cl) is the highest possible with the drag value to be the lowest possible in order to have an effective lift with the highest value. Then we look on the cl versus AoA (α) graph in order to find the angle of attack to find the best lift.

When comparing the results presented we observe that the model with the highest lift coefficient is airfoil jn1413-362 followed by airfoil jn1431-265 and lastly Selig S1223. The latter for comparison purposes.

In order to calculate the maximum load weight the lift force (FL) will be calculated, which formula is:

$$FL = cl \rho Uo^2 A$$

A is the wing's surface area. The tridimensional lift coefficient is $C_{l\,max} = 0.9cl$.

The maximum load weight is obtained with the formula:

$$W_{effective} = W_{max} - W_{airplane}$$

$$W_{max} = \frac{F_L}{g}$$

Where g is the acceleration of gravity. And the weight of the airplane is obtained by adding the weight of the fuselage, of the wing and the minimum load. The results are shown on table of FIG. 9.

The following chart depicts the maximum load results:

| Wing's Surface Area | | 1.13328 | |
| --- | --- | --- | --- |
| airfoil | jn1413-362 | jn1431-265 | Selig S1223 |
| $Cl_{max}$ | 54.374 | 51.235 | 21.235 |
| $C_{L.max}$ | 60.113 | 57.267 | 23.432 |
| $L_{max}$ | 58.349 | 54.457 | 15.793 |
| $W_{max}$ | 68.525 | 65.458 | 30.527 |
| $W_{airplane}$ | 10.150 | 10.150 | 10.150 |
| $W_{effective}$ | 58.375 | 55.308 | 19.323 |

Airfoils jn1413-362 and jn1431-265 can carry substantially more weight than airfoil S1223 (which was used for comparative purposes). Even though each airfoil may be used separately in building a wing; the combination of airfoils jn1413-362 (for the wing tip) and jn1431-365 (for the wing root) given their differential in the lift coefficient contributes to a better lateral stability.

I claim:

1. A method for increasing lift value of an aircraft comprising:

having a wing with an airfoil characterized by the coordinate pairs x/c, y/c given by the following table:

| x/c | y/c |
| --- | --- |
| 1.0000 | 0.0000 |
| 0.9430 | 0.0175 |
| 0.8865 | 0.0323 |
| 0.8308 | 0.0447 |
| 0.7762 | 0.0552 |
| 0.7231 | 0.0640 |

-continued

| x/c | y/c |
| --- | --- |
| 0.6718 | 0.0716 |
| 0.6226 | 0.0783 |
| 0.5758 | 0.0846 |
| 0.5313 | 0.0904 |
| 0.4886 | 0.0955 |
| 0.4475 | 0.0999 |
| 0.4075 | 0.1033 |
| 0.3682 | 0.1057 |
| 0.3293 | 0.1068 |
| 0.2904 | 0.1067 |
| 0.2517 | 0.1051 |
| 0.2138 | 0.1020 |
| 0.1773 | 0.0977 |
| 0.1430 | 0.0919 |
| 0.1114 | 0.0848 |
| 0.0831 | 0.0763 |
| 0.0590 | 0.0665 |
| 0.0392 | 0.0557 |
| 0.0237 | 0.0442 |
| 0.0121 | 0.0325 |
| 0.0042 | 0.0221 |
| −0.0003 | 0.0127 |
| −0.0016 | 0.0051 |
| 0.0000 | 0.0000 |
| 0.0010 | −0.0034 |
| 0.0041 | −0.0071 |
| 0.0097 | −0.0110 |
| 0.0180 | −0.0149 |
| 0.0293 | −0.0187 |
| 0.0439 | −0.0222 |
| 0.0620 | −0.0253 |
| 0.0840 | −0.0280 |
| 0.1096 | −0.0301 |
| 0.1383 | −0.0317 |
| 0.1696 | −0.0329 |
| 0.2032 | −0.0338 |
| 0.2385 | −0.0343 |
| 0.2752 | −0.0345 |
| 0.3126 | −0.0345 |
| 0.3506 | −0.0343 |
| 0.3889 | −0.0340 |
| 0.4272 | −0.0335 |
| 0.4655 | −0.0330 |
| 0.5035 | −0.0324 |
| 0.5410 | −0.0318 |
| 0.5778 | −0.0313 |
| 0.6147 | −0.0306 |
| 0.6545 | −0.0294 |
| 0.7001 | −0.0273 |
| 0.7544 | −0.0237 |
| 0.8206 | −0.0183 |
| 0.9014 | −0.0105 |
| 1.0000 | 0.0000. |

2. A method for increasing lift value of an aircraft comprising:

having a wing with an airfoil characterized by the coordinate pairs x/c, y/c given by the following table:

| x/c | y/c |
| --- | --- |
| 1.00000 | 0.00000 |
| 0.93208 | 0.01735 |
| 0.86931 | 0.03162 |
| 0.81110 | 0.04326 |
| 0.75688 | 0.05274 |
| 0.70609 | 0.06050 |
| 0.65816 | 0.06700 |
| 0.61252 | 0.07269 |
| 0.56862 | 0.07799 |
| 0.52612 | 0.08296 |
| 0.48480 | 0.08744 |
| 0.44444 | 0.09132 |
| 0.40479 | 0.09445 |

| x/c | y/c |
| --- | --- |
| 0.36565 | 0.09669 |
| 0.32678 | 0.09790 |
| 0.28797 | 0.09796 |
| 0.24942 | 0.09678 |
| 0.21171 | 0.09436 |
| 0.17546 | 0.09069 |
| 0.14128 | 0.08574 |
| 0.10977 | 0.07951 |
| 0.08155 | 0.07198 |
| 0.05722 | 0.06316 |
| 0.03716 | 0.05320 |
| 0.02128 | 0.04262 |
| 0.00946 | 0.03199 |
| 0.00155 | 0.02185 |
| −0.00257 | 0.01277 |
| −0.00305 | 0.00530 |
| 0.00000 | 0.00000 |
| 0.00093 | −0.00350 |
| 0.00392 | −0.00748 |
| 0.00929 | −0.01180 |
| 0.01735 | −0.01630 |
| 0.02843 | −0.02084 |
| 0.04284 | −0.02526 |
| 0.06090 | −0.02941 |
| 0.08287 | −0.03316 |
| 0.10851 | −0.03643 |
| 0.13736 | −0.03922 |
| 0.16892 | −0.04150 |
| 0.20271 | −0.04325 |
| 0.23825 | −0.04445 |
| 0.27506 | −0.04508 |
| 0.31266 | −0.04513 |
| 0.35071 | −0.04463 |
| 0.38901 | −0.04368 |
| 0.42735 | −0.04235 |
| 0.46555 | −0.04074 |
| 0.50340 | −0.03894 |
| 0.54070 | −0.03704 |
| 0.57728 | −0.03513 |
| 0.61394 | −0.03316 |
| 0.65348 | −0.03078 |
| 0.69893 | −0.02764 |
| 0.75328 | −0.02336 |
| 0.81957 | −0.01757 |
| 0.90080 | −0.00990 |
| 1.00000 | 0.00000. |

3. A method for increasing lateral stability of an aircraft comprising:

having a wing with a wingtip airfoil characterized by the coordinate pairs x/c, y/c given by the following table:

| x/c | y/c |
| --- | --- |
| 1.0000 | 0.0000 |
| 0.9430 | 0.0175 |
| 0.8865 | 0.0323 |
| 0.8308 | 0.0447 |
| 0.7762 | 0.0552 |
| 0.7231 | 0.0640 |
| 0.6718 | 0.0716 |
| 0.6226 | 0.0783 |
| 0.5758 | 0.0846 |
| 0.5313 | 0.0904 |
| 0.4886 | 0.0955 |
| 0.4475 | 0.0999 |
| 0.4075 | 0.1033 |
| 0.3682 | 0.1057 |
| 0.3293 | 0.1068 |
| 0.2904 | 0.1067 |
| 0.2517 | 0.1051 |
| 0.2138 | 0.1020 |
| 0.1773 | 0.0977 |
| 0.1430 | 0.0919 |
| 0.1114 | 0.0848 |
| 0.0831 | 0.0763 |
| 0.0590 | 0.0665 |
| 0.0392 | 0.0557 |
| 0.0237 | 0.0442 |
| 0.0121 | 0.0325 |
| 0.0042 | 0.0221 |
| −0.0003 | 0.0127 |
| −0.0016 | 0.0051 |
| 0.0000 | 0.0000 |
| 0.0010 | −0.0034 |
| 0.0041 | −0.0071 |
| 0.0097 | −0.0110 |
| 0.0180 | −0.0149 |
| 0.0293 | −0.0187 |
| 0.0439 | −0.0222 |
| 0.0620 | −0.0253 |
| 0.0840 | −0.0280 |
| 0.1096 | −0.0301 |
| 0.1383 | −0.0317 |
| 0.1696 | −0.0329 |
| 0.2032 | −0.0338 |
| 0.2385 | −0.0343 |
| 0.2752 | −0.0345 |
| 0.3126 | −0.0345 |
| 0.3506 | −0.0343 |
| 0.3889 | −0.0340 |
| 0.4272 | −0.0335 |
| 0.4655 | −0.0330 |
| 0.5035 | −0.0324 |
| 0.5410 | −0.0318 |
| 0.5778 | −0.0313 |
| 0.6147 | −0.0306 |
| 0.6545 | −0.0294 |
| 0.7001 | −0.0273 |
| 0.7544 | −0.0237 |
| 0.8206 | −0.0183 |
| 0.9014 | −0.0105 |
| 1.0000 | 0.0000 | and;

said wing further having a wingroot airfoil characterized by the coordinate pairs x/c, y/c given by the following table:

| x/c | y/c |
| --- | --- |
| 1.0000 | 0.0000 |
| 0.9430 | 0.0175 |
| 0.8865 | 0.0323 |
| 0.8308 | 0.0447 |
| 0.7762 | 0.0552 |
| 0.7231 | 0.0640 |
| 0.6718 | 0.0716 |
| 0.6226 | 0.0783 |
| 0.5758 | 0.0846 |
| 0.5313 | 0.0904 |
| 0.4886 | 0.0955 |
| 0.4475 | 0.0999 |
| 0.4075 | 0.1033 |
| 0.3682 | 0.1057 |
| 0.3293 | 0.1068 |
| 0.2904 | 0.1067 |
| 0.2517 | 0.1051 |
| 0.2138 | 0.1020 |
| 0.1773 | 0.0977 |
| 0.1430 | 0.0919 |
| 0.1114 | 0.0848 |
| 0.0831 | 0.0763 |
| 0.0590 | 0.0665 |
| 0.0392 | 0.0557 |
| 0.0237 | 0.0442 |
| 0.0121 | 0.0325 |
| 0.0042 | 0.0221 |

-continued

| x/c | y/c |
|---|---|
| −0.0003 | 0.0127 |
| −0.0016 | 0.0051 |
| 0.0000 | 0.0000 |
| 0.0010 | −0.0034 |
| 0.0041 | −0.0071 |
| 0.0097 | −0.0110 |
| 0.0180 | −0.0149 |
| 0.0293 | −0.0187 |
| 0.0439 | −0.0222 |
| 0.0620 | −0.0253 |
| 0.0840 | −0.0280 |
| 0.1096 | −0.0301 |
| 0.1383 | −0.0317 |
| 0.1696 | −0.0329 |
| 0.2032 | −0.0338 |
| 0.2385 | −0.0343 |
| 0.2752 | −0.0345 |
| 0.3126 | −0.0345 |
| 0.3506 | −0.0343 |
| 0.3889 | −0.0340 |
| 0.4272 | −0.0335 |
| 0.4655 | −0.0330 |
| 0.5035 | −0.0324 |
| 0.5410 | −0.0318 |
| 0.5778 | −0.0313 |
| 0.6147 | −0.0306 |
| 0.6545 | −0.0294 |
| 0.7001 | −0.0273 |
| 0.7544 | −0.0237 |
| 0.8206 | −0.0183 |
| 0.9014 | −0.0105 |
| 1.0000 | 0.0000. |

\* \* \* \* \*